(12) United States Patent
Paiuk

(10) Patent No.: US 12,294,620 B2
(45) Date of Patent: *May 6, 2025

(54) COMMUNICATION SESSION TRANSFER USING VISUAL CODE

(71) Applicant: Zoom Communications, Inc., San Jose, CA (US)

(72) Inventor: Alejandro Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,685

(22) Filed: Apr. 24, 2024

(65) Prior Publication Data

US 2024/0364760 A1 Oct. 31, 2024

Related U.S. Application Data

(63) Continuation of application No. 18/306,646, filed on Apr. 25, 2023, now Pat. No. 11,997,149.

(51) Int. Cl.
*H04L 65/403* (2022.01)
*H04L 9/40* (2022.01)
*H04L 65/401* (2022.01)
*H04L 69/14* (2022.01)
*H04W 4/14* (2009.01)

(52) U.S. Cl.
CPC ........ *H04L 65/403* (2013.01); *H04L 63/0853* (2013.01); *H04L 65/401* (2022.05); *H04L 69/14* (2013.01); *H04W 4/14* (2013.01)

(58) Field of Classification Search
CPC ..... H04L 65/401; H04L 69/14; H04L 65/403; H04L 63/0853; H04W 4/14
See application file for complete search history.

(56) References Cited

U.S. PATENT DOCUMENTS

| 8,161,172 | B2 | 4/2012 | Reisman | |
|---|---|---|---|---|
| 9,256,726 | B2* | 2/2016 | Ordille | H04M 3/58 |
| 9,787,617 | B2 | 10/2017 | Ciavatta | |
| 10,375,351 | B2 | 8/2019 | Du et al. | |
| 2004/0215974 | A1* | 10/2004 | Conley | H04L 63/061 726/4 |
| 2006/0001737 | A1* | 1/2006 | Dawson | H04N 7/15 348/E7.083 |
| 2013/0212286 | A1* | 8/2013 | Krishnakumar | H04L 65/1066 709/227 |

(Continued)

FOREIGN PATENT DOCUMENTS

WO 2020224486 A1 11/2020

*Primary Examiner* — William G Trost, IV
*Assistant Examiner* — Adam A Cooney
(74) *Attorney, Agent, or Firm* — Young Basile Hanlon & MacFarlane, P.C.

(57) ABSTRACT

A conference system enables a communication session between two or more participants. During the communication session, a participant device displays a visual code that is scanned by the device in which the identity is unknown. Based on the scan of the visual code, the conference system transfers the communication session such that it is continued between the device in which the identity is unknown and the one or more devices of the remaining participants of the conference.

20 Claims, 9 Drawing Sheets

(56) References Cited

U.S. PATENT DOCUMENTS

| | | | |
|---|---|---|---|
| 2013/0222519 A1* | 8/2013 | Lee | H04N 7/15 |
| | | | 348/14.02 |
| 2016/0057123 A1* | 2/2016 | Jiang | H04L 67/14 |
| | | | 726/7 |
| 2016/0219084 A1* | 7/2016 | AbiEzzi | H04L 67/565 |
| 2018/0227128 A1* | 8/2018 | Church | H04L 9/3247 |
| 2019/0230165 A1* | 7/2019 | Wang | G06F 9/452 |

\* cited by examiner

COMMUNICATION SESSION TRANSFER USING VISUAL CODE

CROSS-REFERENCE TO RELATED APPLICATION(S)

This application is a continuation of U.S. patent application Ser. No. 18/306,646, filed Apr. 25, 2023, the entire disclosure of which is hereby incorporated by reference.

FIELD

This disclosure relates to real-time communication session transfers based on visual codes.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
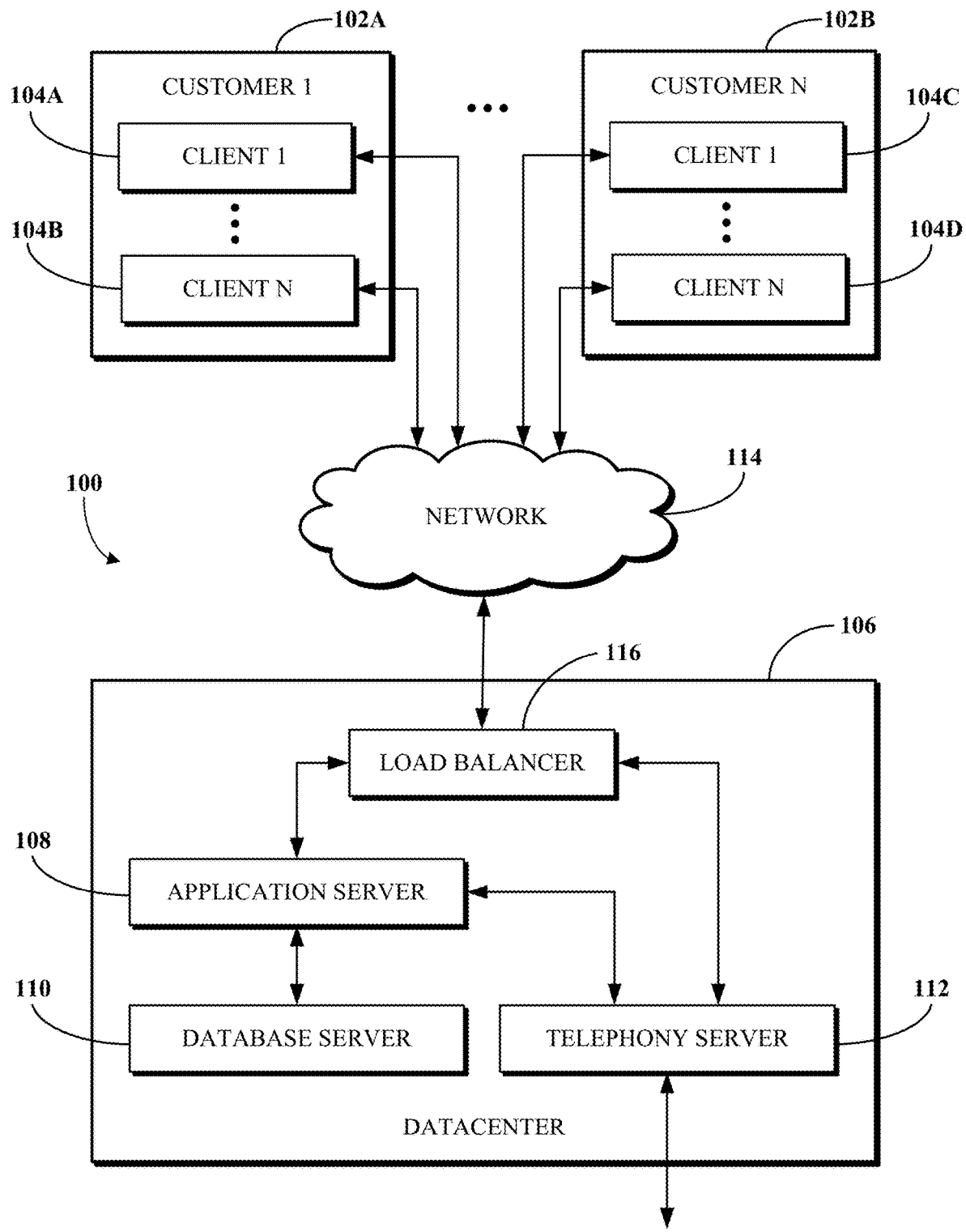
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

A software platform, such as a UCaaS platform, may facilitate an RTCS between multiple participants over one of one or more possible modalities enabled via software services of the software platform. For example, the RTCS can be a chat messaging session, a telephony session, a video conference session, or another communication session. During the RTCS, a participant may want to transfer the RTCS to a mobile device, where the mobile device and/or a user of the mobile device are unknown to the participant, for example, when the mobile device is associated with a different user account than the participant device, such as during an emergency or another scenario. For example, during an emergency, the participant may have an ongoing RTCS with a 911 operator and may wish to transfer the RTCS to a device of an emergency medical technician when the ambulance arrives. Typical software platforms cannot transfer an ongoing RTCS between two or more mobile devices to another mobile device, where the other mobile device and/or the user of the other mobile device is unknown to the participant or is associated with a different user account than the participant device. In typical software platforms, the other mobile device must be known or associated with the same user account as the participant device so that the other mobile device can be selected from a drop down menu or contact list in order to transfer the RTCS.

Software platforms can be used in retail applications to improve the shopping experience. For example, with the advent of shopping delivery services, some consumers may want to see the complete process of item selection to delivery via a video call, such as in the case of grocery delivery. Typical shopping delivery services use independent personnel that have no relation to each other. For example, a shopper that selects the items typically does not know the identity of the driver that delivers the items to the consumer (e.g., the mobile device of the driver is typically associated with a different user account for the software platform than the mobile device of the shopper). In this example, the consumer may want to indicate which produce the shopper should select via the video call and continue the video call with the driver during delivery to ensure that the groceries are not damaged during transit. Currently, the identity of the driver must be known in order to transfer the video call to the mobile device of the driver (i.e., the mobile device of the driver and the mobile device of the shopper must be associated with the same user account such that the driver can be selected in a drop down menu or contact list to transfer the video call). However, since the mobile device of the driver is associated with a different user account than the mobile device of the shopper, the video call cannot be transferred.

In a typical software platform, an RTCS cannot be transferred from one device associated with a user account to another device associated with another user account. In some current software platforms, the RTCS can be transferred from one device to another device if both devices are associated with the same user account. In some situations, it may be necessary or desirable to transfer an RTCS form one device to another device, where the devices are associated with different user accounts, however this functionality is unavailable in conventional software platforms. Implementations of this disclosure address problems such as these by using a code, such as a visual code, to generate a radio signal to transfer the RTCS from one mobile device to another mobile device. The visual code may be, for example, a quick response (QR) code, a bar code, an image with an embedded code, or another visual code. The visual code is displayed on the mobile device and can be scanned by the other mobile device to authenticate the other mobile device without prior knowledge of the identity of the other mobile device or the identity of the user of the other mobile device. In contrast to conventional software platforms, implementations of this disclosure enable devices associated with different user accounts to transfer RTCSs between each other. By enabling devices associated with different user accounts to transfer RTCSs between each other, the technological area of conference communications is improved such that the transfer of RTCSs are not limited by the devices or user accounts associated with the devices.

To describe some implementations in greater detail, reference is first made to examples of hardware and software structures used to implement a system for visual based RTCS transfer. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, such as a contact center, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
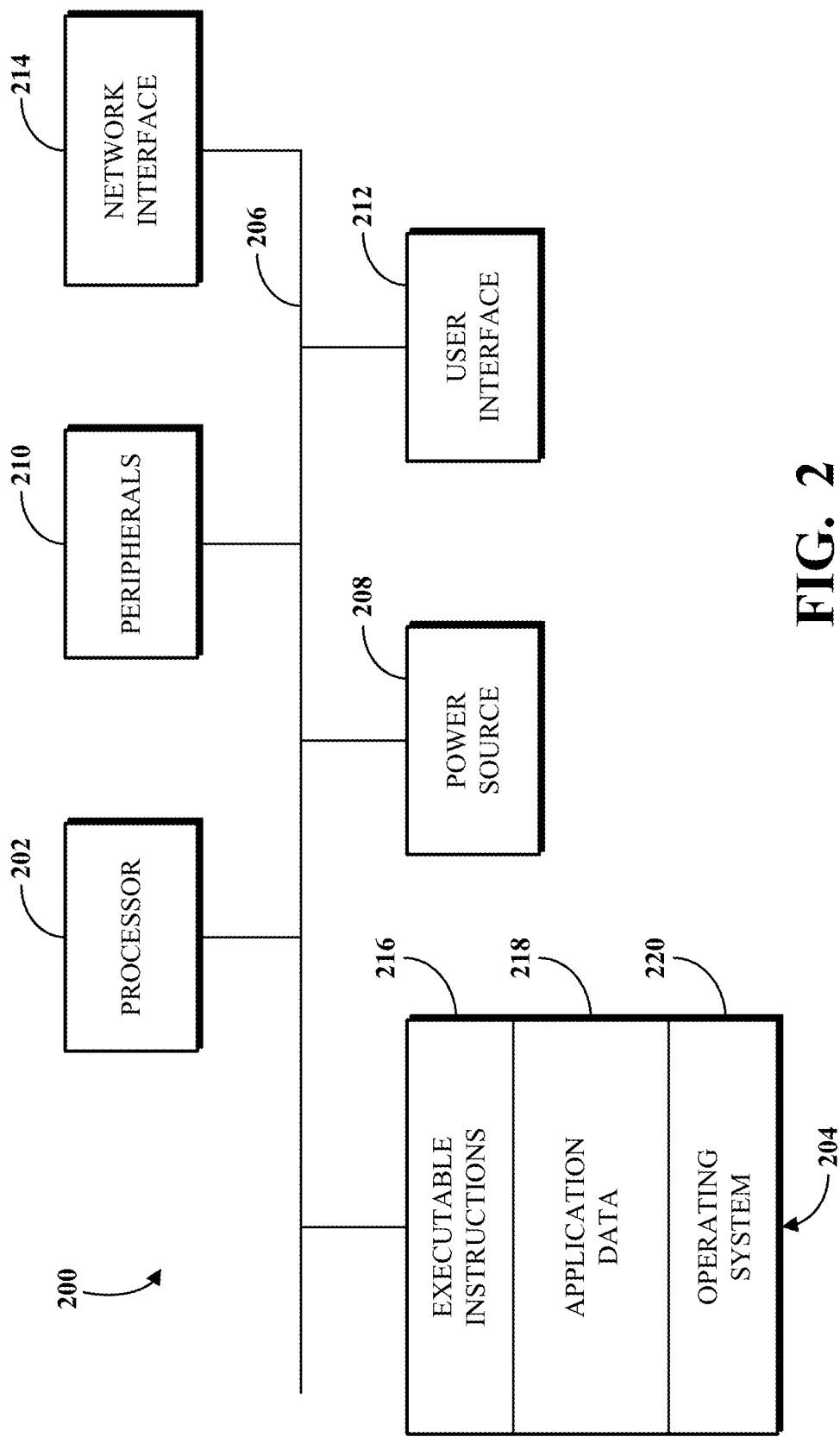
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
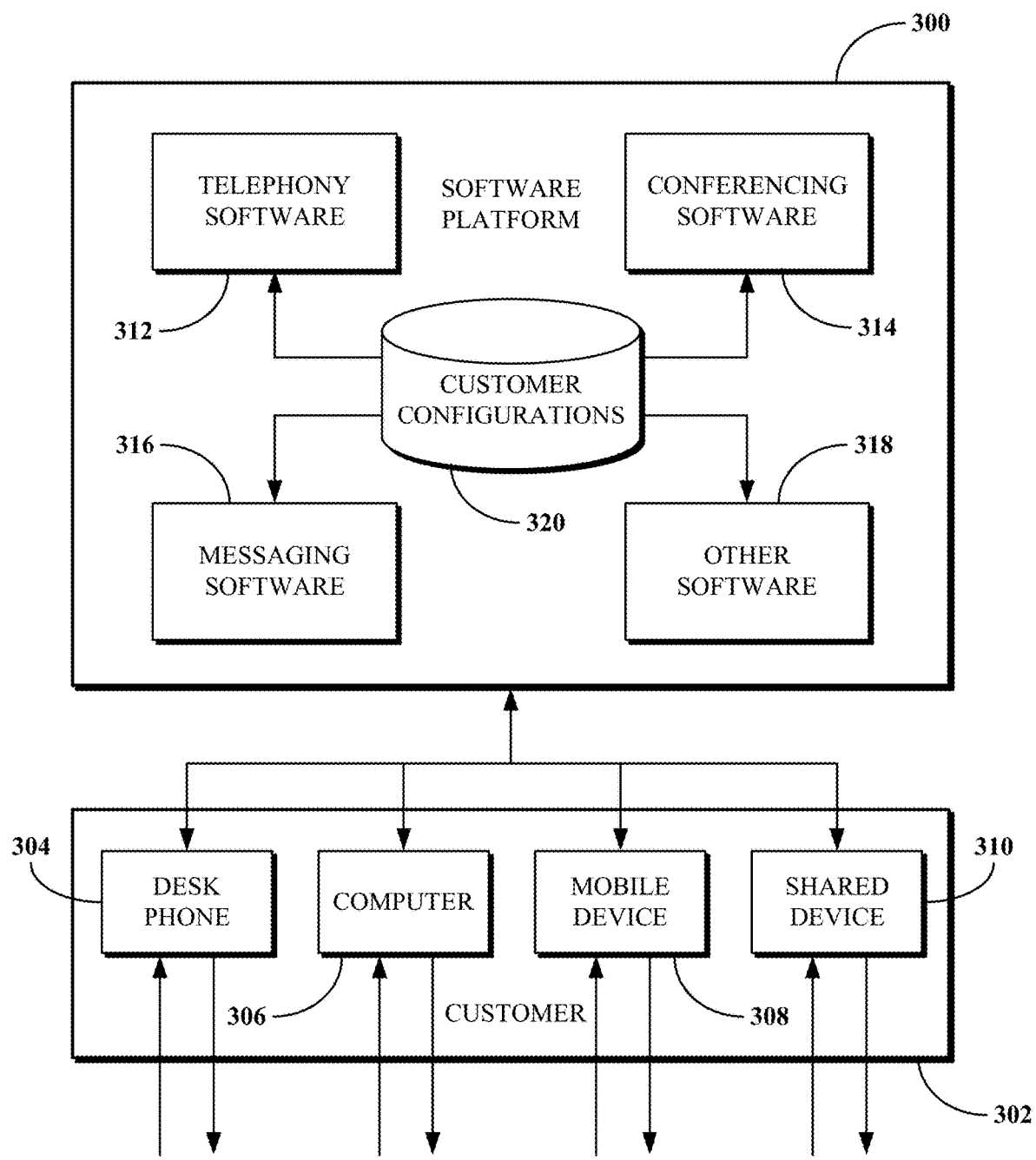
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can enable RTCS transfers based on visual codes.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
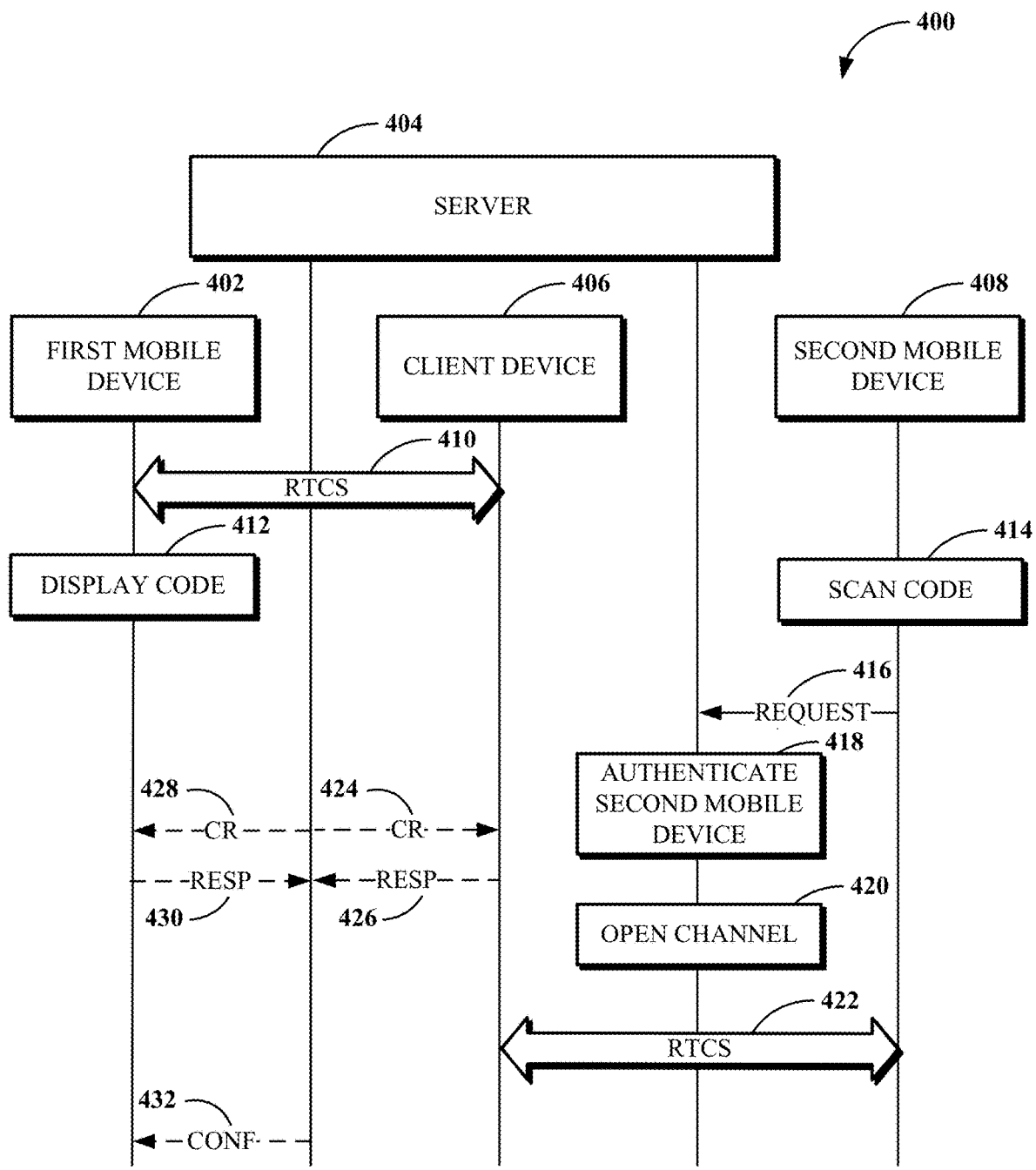
FIG. 4 is a swim lane diagram of an example of a system for a real-time communication session (RTCS) transfer based on a visual code.

FIG. 4 is a swim lane diagram of an example of a system 400 for an RTCS transfer based on a visual code. The system 400 includes a first mobile device 402, a server 404, a client device 406, and a second mobile device 408. One or both of the first mobile device 402 or the second mobile device 408 may be the mobile device 308 shown in FIG. 3. For example, one or both of the first mobile device 402 or the second mobile device 408 may each be a client device that runs software for connecting to software services of a software platform, such as services implemented via the software 312 through 318 shown in FIG. 3. In another example, neither of the first mobile device 402 or the second mobile device 408 may be a client device and may instead access such software services using a web browser or other non-client application. The server 404 may be used to instantiate one or more software services of a software platform (e.g., the software platform 300 shown in FIG. 3), for example, a chat messaging service, a telephony service, a video conference service, or another communication service. The client device 406 is a device configured to run a client application capable of connecting to such a software service and may, for example, be one of the desk phone 304, the computer 306, the mobile device 308, or the shared device 310 shown in FIG. 3. The identity of the second mobile device 408 and the identity of a user of the second mobile device 408 are each unknown to the participant, for example, when the second mobile device 408 is associated with a different user account than the first mobile device 402.

As shown in FIG. 4, the server 404 is configured to enable a RTCS 410 between the first mobile device 402 and the client device 406. The RTCS 410 may be a chat messaging session, a telephony session, a video conference session, or another communication session. The RTCS 410 may be initiated by the first mobile device 402 or the client device 406 by transmitting a request to the server 404. At some point during the RTCS 410, the first mobile device 402 displays 412 a code. The code may be obtained from the server 404 or it may be generated by an application running on the first mobile device 402. The code may, for example, be displayed within the application running on the first mobile device 402, where the application may be associated with the software platform 300 shown in FIG. 3. The code can be a visual code and may include embedded information associated with the RTCS 410, such as channel information, a device identifier (ID) of the first mobile device 402, a device ID of the client device 406, a pre-authentication code, or any combination thereof. The information that is embedded in the code may be obtained from the request to initiate the RTCS 410 and/or obtained from the server 404. In some implementations, the code may be transmitted as a radio signal, such as a near-field communication (NFC) signal, a Bluetooth signal, a Wi-Fi signal, or another radio signal.

The second mobile device 408 scans 414 the code that is displayed on the display of the first mobile device 402. The second mobile device 408 may scan the code using a camera of the second mobile device 408. The second mobile device 408 may be running a client application associated with the software platform 300 shown in FIG. 3. The second mobile device 408 may scan the code using the camera of the second mobile device 408 via the client application associated with the software platform. Scanning the code can include extracting embedded information in the scanned code. In an implementation where the code is transmitted by the first mobile device 402 as a radio signal, the second mobile device 408 may scan the code using a receiver, such as an NFC receiver, of the second mobile device 408.

The second mobile device 408 transmits a request 416 to the server 404 to transfer the RTCS 410 from the first mobile device 402 to the second mobile device 408. The request 416 may include embedded information associated with the RTCS 410, such as channel information, a device ID of the first mobile device 402, a device ID of the client device 406, a device ID of the second mobile device 408, a pre-authentication code, or any combination thereof.

The server 404 receives the request 416 and authenticates 418 the second mobile device 408. Authenticating the second mobile device 408 includes verifying the identity of the second mobile device 408 and granting the second mobile device 408 access to the RTCS 410 when the identity is verified. The server 404 may authenticate the second mobile device 408 by comparing an embedded pre-authentication code and/or device ID of the client device 406 in the request 416 to a pre-authentication code and/or device ID of the client device 406 stored on the server 404. If the embedded pre-authentication code and/or device ID of the client device 406 in the request 416 matches the pre-authentication code and/or device ID of the client device 406 stored on the server 404, the server opens 420 a communication channel between the client device 406 and the second mobile device 408. Opening the communication channel between the client device 406 and the second mobile device 408 may include terminating a communication channel between the first mobile device 402 and the client device 406. The server 404 transfers the RTCS 410 to the communication channel between the client device 406 and the second mobile device 408 such that RTCS 422 is a continuation of the RTCS 410 between the client device 406 and the second mobile device 408.

In some implementations, the server 404 may transmit a confirmation request (CR) 424 to the client device 406. The CR 424 may be a pop-up notification, a notification in a chat message, or a short messaging service (SMS) notification requesting a confirmation of a transfer of the RTCS 410 to the communication channel between the client device 406 and the second mobile device 408. The CR 424 may prompt a user of the client device 406 to provide an input. The input may be a touch input, a keyboard input, a mouse input, a voice input, or a gesture input. In response to the input, the client device 406 transmits a response 426 to the server 404. The response 426 is based on the input and indicates whether the transfer is confirmed or denied. If the transfer is confirmed, the server 404 transfers the RTCS 410 to the communication channel between the client device 406 and the second mobile device 408.

In some implementations, the server 404 may transmit a CR 428 to the first mobile device 402. The CR 428 may be a pop-up notification, a notification in a chat message, or an SMS notification requesting a confirmation of a transfer of the RTCS 410 to the communication channel between the client device 406 and the second mobile device 408. The CR 428 may prompt a user of the first mobile device 402 to provide an input. The input may be a touch input, a keyboard input, a mouse input, a voice input, or a gesture input. In response to the input, the first mobile device 402 transmits a response 430 to the server 404. The response 430 is based on the input and indicates whether the transfer is confirmed or denied. If the transfer is confirmed, the server 404 transfers the RTCS 410 to the communication channel between the client device 406 and the second mobile device 408.

In some implementations, where both the CR 424 and the CR 428 are used, the server 404 may transmit the CR 424 and the CR 428 to the client device 406 and the first mobile device 402, respectively. In response to a respective input, the client device 406 and the first mobile device 402 transmit the response 426 and the response 430 to the server 404. If both the response 426 and the response 430 indicate that the transfer is confirmed, the server 404 transfers the RTCS 410 to the communication channel between the client device 406 and the second mobile device 408. In some implementations, the server 404 may transmit a confirmation message 432 to the first mobile device 402 that indicates that the transfer of the RTCS 410 was successful.

As an illustrative use case, the system 400 may be used in an emergency services scenario. In this example, the user of the client device 406 may be an agent at an emergency services provider contact center. The user of the first mobile device 402 is experiencing an emergency and initiates the RTCS 410 with the client device 406 via the first mobile device 402. When the RTCS 410 is initiated, the first mobile device displays 412 a code that can be scanned by a device such as the second mobile device 408 of a first responder (e.g., a policeman, a firefighter, an emergency medical technician, or another first responder) to transfer the RTCS between the first mobile device 402 and the client device 406 such that it continues as RTCS 422 between the client device 406 and the second mobile device 408. In this way, the first responder can continue the conversation with the agent and provide any necessary updates on the emergency at hand.

In another illustrative use case, the code may be printed on a receipt or a user manual. In this example, a consumer can scan the code on the receipt or the user manual using their mobile device to initiate an interaction with a contact center. The interaction may be an SMS message, an email, a chat messaging session, a voice call, a video call, or another type of interaction to lodge a complaint, participate in a survey, submit a review, register a product, obtain warranty information, or obtain product support.

In another illustrative use case, the code may be displayed at device in an unmanned retail space, such as a kiosk or a vending machine. The code may be displayed on a display of the device or the code may be printed on a surface of the device. In this example, a consumer can scan the code on the device using their mobile device to initiate an interaction with a remote employee of the retail establishment to obtain assistance.

Figure 5:
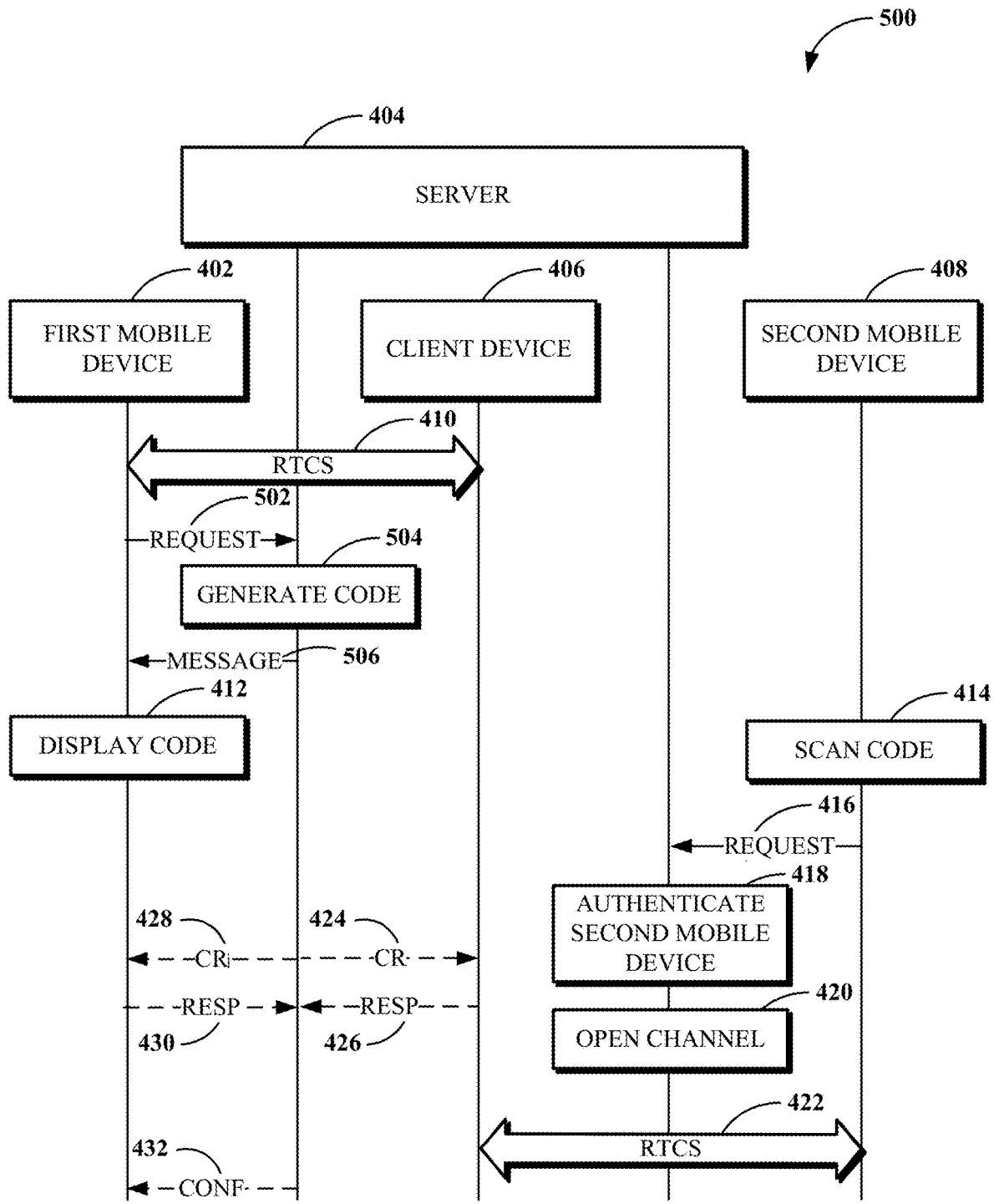
FIG. 5 is a swim lane diagram on another example of a system for an RTCS transfer based on a visual code.

FIG. 5 is a swim lane diagram on another example of a system 500 for an RTCS transfer based on a visual code. The system 500 includes the first mobile device 402, the server 404, the client device 406, and the second mobile device 408 shown in FIG. 4.

Similar to the example shown in FIG. 4, the server 404 is configured to enable the RTCS 410 between the first mobile device 402 and the client device 406 via a communication channel. At some point during the RTCS 410, the first mobile device 402 transmits a request 502 to the server 404. The request 502 may be a request to transfer the RTCS 410 to another device. The request 502 may include embedded information associated with the RTCS 410.

The server 404 receives the request 502 and generates 504 a code based on the request 502. The server 404 may embed information in the code, such as channel information, the device ID of the first mobile device 402, the device ID of the client device 406, a pre-authentication code, or any combination thereof. The server 404 transmits the code to the first mobile device 402 via a message 506. The first mobile device 402 receives the message 506 and displays 412 the code. The system 500 then performs the remaining operations as shown in FIG. 4 to transfer the RTCS 410 to the communication channel between the client device 406 and the second mobile device 408 such that RTCS 422 is a continuation of the RTCS 410 between the client device 406 and the second mobile device 408.

As an illustrative use case, the system 500 may be used in a delivery services scenario. Delivery services typically use independent personnel that have no relation to each other. In this example, the first mobile device 402 may belong to a shopper, the client device 406 may belong to a consumer, and the second mobile device 408 may belong to a driver. In this example, the shopper selects the items and does not know the identity of the driver that delivers the items to the consumer. The consumer may want to indicate which produce the shopper should select via the RTCS 410 and continue the RTCS 422 with the driver during delivery to ensure that the groceries are not damaged during transit. The first mobile device 402 of the shopper displays a code that can be scanned by the second mobile device 408 of the driver to transfer the RTCS 410 between the first mobile device 402 and the client device 406 such that it continues as the RTCS 422 between the client device 406 and the second mobile device 408.

Figure 6:
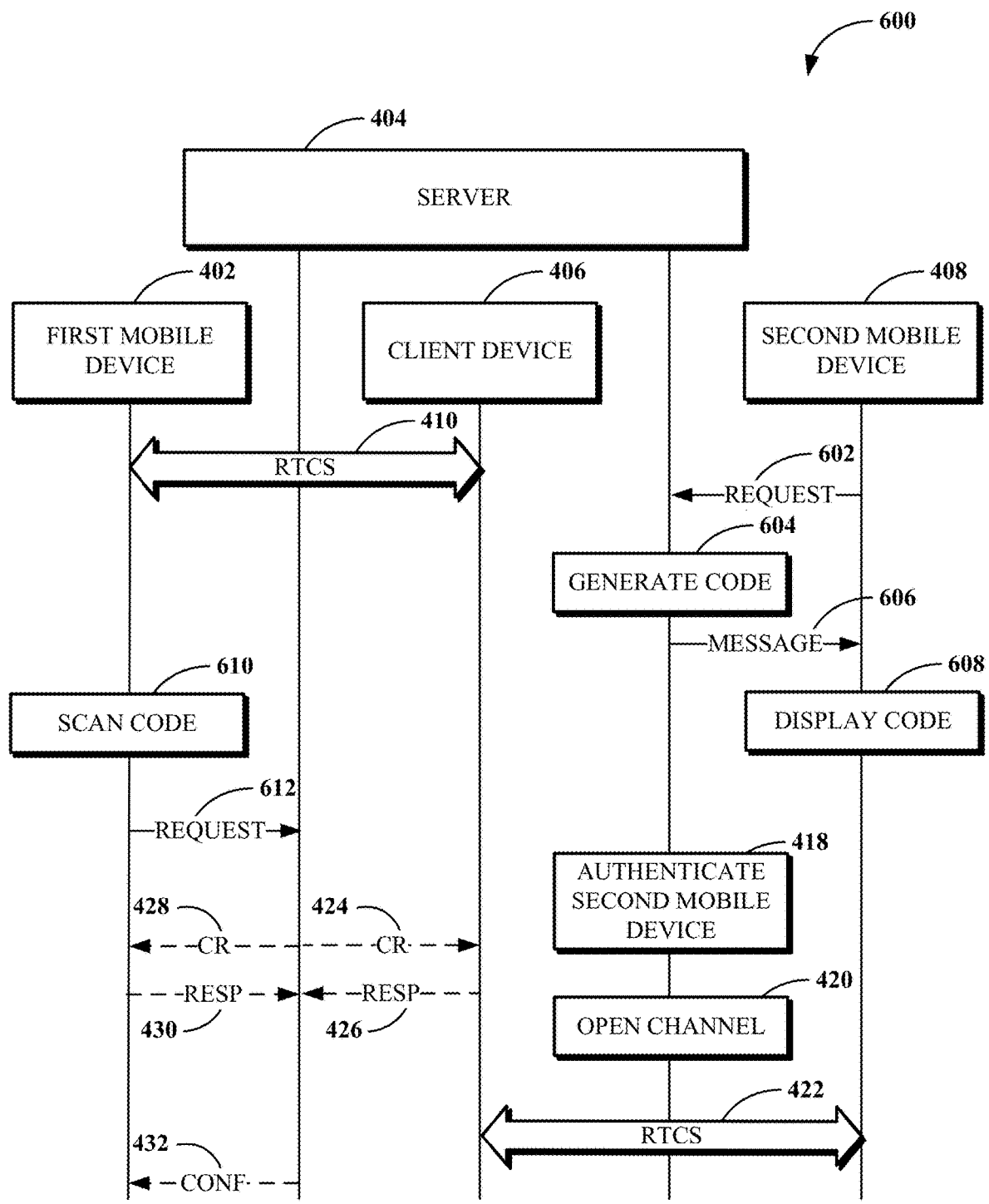
FIG. 6 is a swim lane diagram of another example of a system for an RTCS transfer based on a visual code.

FIG. 6 is a swim lane diagram of another example of a system 600 for an RTCS transfer based on a visual code. The system 600 includes the first mobile device 402, the server 404, the client device 406, and the second mobile device 408 shown in FIG. 4.

Similar to the example shown in FIG. 4, the server 404 is configured to enable the RTCS 410 between the first mobile device 402 and the client device 406 via a communication channel. At some point during the RTCS 410, the second mobile device 408 transmits a request 602 to the server 404. The request 602 may be a request to transfer an RTCS to the second mobile device 408. The request 602 may include a device ID of the second mobile device 408.

The server 404 receives the request 602 and generates 604 a code based on the request 602. The server 404 may embed information in the code, such as channel information of the RTCS 410, a device ID of the first mobile device 402, a device ID of the client device 406, the device ID of the second mobile device 408, a pre-authentication code, or any combination thereof. The server 404 transmits the code to the second mobile device 408 via a message 606. The second mobile device 408 receives the message 606 and displays 608 the code. The code may be displayed by the second mobile device 408 in a similar fashion as described above with reference to FIG. 4 and the first mobile device 402.

The first mobile device 402 scans 610 the code that is displayed on the display of the second mobile device 408. The first mobile device 402 may scan the code using a camera of the first mobile device 402. The first mobile device 402 may be running the application associated with the software platform 300 shown in FIG. 3. The first mobile device 402 may scan the code using the camera of the first mobile device 402 via the application associated with the software platform. Scanning the code can include extracting embedded information in the scanned code. The embedded information can include information associated with the RTCS 410. In an implementation where the code is transmitted by the second mobile device 408 as a radio signal, the first mobile device 402 may scan the code using a receiver, such as an NFC receiver, of the first mobile device 402.

Upon scanning the code, the first mobile device 402 transmits a request 612 to the server 404 to transfer the RTCS 410 from the first mobile device 402 to the second mobile device 408. The request 612 may include embedded information associated with the RTCS 410. The system 600 then performs the remaining operations as shown in FIG. 4 to transfer the RTCS 410 to the communication channel between the client device 406 and the second mobile device 408 such that RTCS 422 is a continuation of the RTCS 410 between the client device 406 and the second mobile device 408.

As an illustrative use case, the system 600 may be used in a design consultation scenario. Design consultation services can use independent service providers that have no relation to each other. In this example, the first mobile device 402 may belong to a home builder at a construction site, the client device 406 may belong to an architect, and the second mobile device 408 may belong to a foreman at the constructions site. In this example, the home builder and the architect may be discussing some design changes over the RTCS 410. The foreman at the construction site may want to request transfer of the RTCS 410 to the second mobile device 408 such that the RTCS 410 can be continued as the RTCS 422 to discuss the design changes with the architect. In this example, the second mobile device 408 of the foreman displays a code that can be scanned by the first mobile device 402 of the home builder to transfer the RTCS 410 between the first mobile device 402 and the client device 406 such that it continues as the RTCS 422 between the client device 406 and the second mobile device 408.

Figure 7:
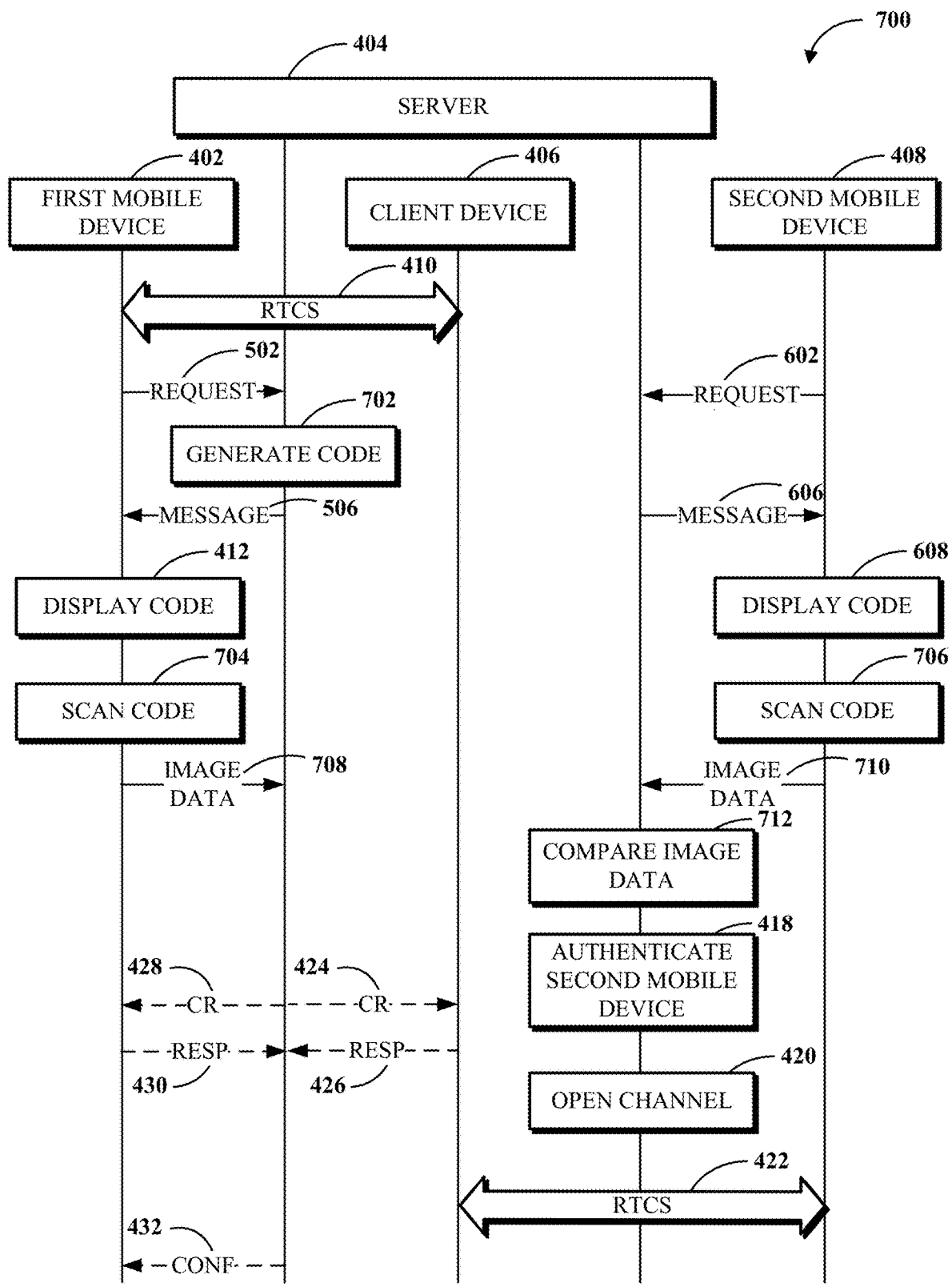
FIG. 7 is a swim lane diagram of another example of a system for an RTCS transfer based on a visual code.

FIG. 7 is a swim lane diagram of another example of a system 700 for an RTCS transfer based on a visual code. The system 700 includes the first mobile device 402, the server 404, the client device 406, and the second mobile device 408 shown in FIG. 4.

Similar to the example shown in FIG. 4, the server 404 is configured to enable the RTCS 410 between the first mobile device 402 and the client device 406 via a communication channel. At some point during the RTCS 410, the first mobile device 402 transmits a request 502 to the server 404 (as shown in FIG. 5), and the second mobile device 408 transmits a request 602 to the server 404 (as shown in FIG. 6).

The server 404 receives the request 502 from the first mobile device 402 and the request 602 from the second mobile device 408, and generates 702 a code based on the request 502 and the request 602. The server 404 may embed information in the code, such as channel information, the device ID of the first mobile device 402, the device ID of the second mobile device 408, the device ID of the client device 406, a pre-authentication code, or any combination thereof. The server 404 transmits the code to the first mobile device 402 via the message 506 and transmits the code to the second mobile device 408 via a message 606. The first mobile device 402 receives the message 506 and displays 412 the code as described above with reference to FIG. 4. The second mobile device 408 receives the message 606 and displays 608 the code as described above with reference to FIG. 6.

The first mobile device 402 scans 704 the code that is displayed on the display of the second mobile device 408, and the second mobile device 408 scans 706 the code that is displayed on the display of the first mobile device 402. The first mobile device 402 may scan the code using a camera, such as a front-facing camera (e.g., a camera on the display side of the device) or rear-facing camera (e.g., a camera on the opposite side of the display of the device) of the first mobile device 402, and the second mobile device 408 may scan the code using a camera, such as a front-facing camera or rear-facing camera of the second mobile device 408. When the front-facing cameras of the first mobile device 402 and the second mobile device 408 are used, the scanning may be performed simultaneously by facing the display side of the first mobile device 402 towards the display side of the second mobile device 408.

The first mobile device 402 transmits image data 708 to the server 404 and the second mobile device 408 transmits image data 710 to the server 404 to transfer the RTCS 410 from the first mobile device 402 to the second mobile device 408. The image data 708 and the image data 710 may each include embedded information associated with the RTCS 410.

The server 404 receives the image data 708 and the image data 710. The server 404 compares 712 the image data 708 and the image data 710. If the image data 708 and the image data 710 match, the server 404 authenticates 418 the second mobile device 408, opens 420 a communication channel between the client device 406 and the second mobile device 408, and performs any remaining operations as described above with reference to FIG. 4.

As an illustrative use case, the system 700 may be used in a hybrid virtual media event where a reporter is at a different location than the interviewees who have no relation to each other, such as athletes at the Olympics. In this example, the first mobile device 402 may belong to a first interviewee, the client device 406 may belong to the reporter, and the second mobile device 408 may belong to a second interviewee. In this example, the reporter is conducting an interview of the first interviewee via the RTCS 410. During the interview, the first mobile device 402 of the first interviewee displays a code that can be scanned by the second mobile device 408 of the second interviewee, and the second mobile device 408 displays a code that can be scanned by the first mobile device 402 of the first interviewee. Both interviewees can scan the codes from the others' devices using their respective mobile devices to transfer the RTCS 410 between the first mobile device 402 and the client device 406 such that it continues as the RTCS 422 between the client device 406 and the second mobile device 408. In this way, the interview with the reporter can be seamlessly switched from the first interviewee to the second interviewee.

Figure 8:
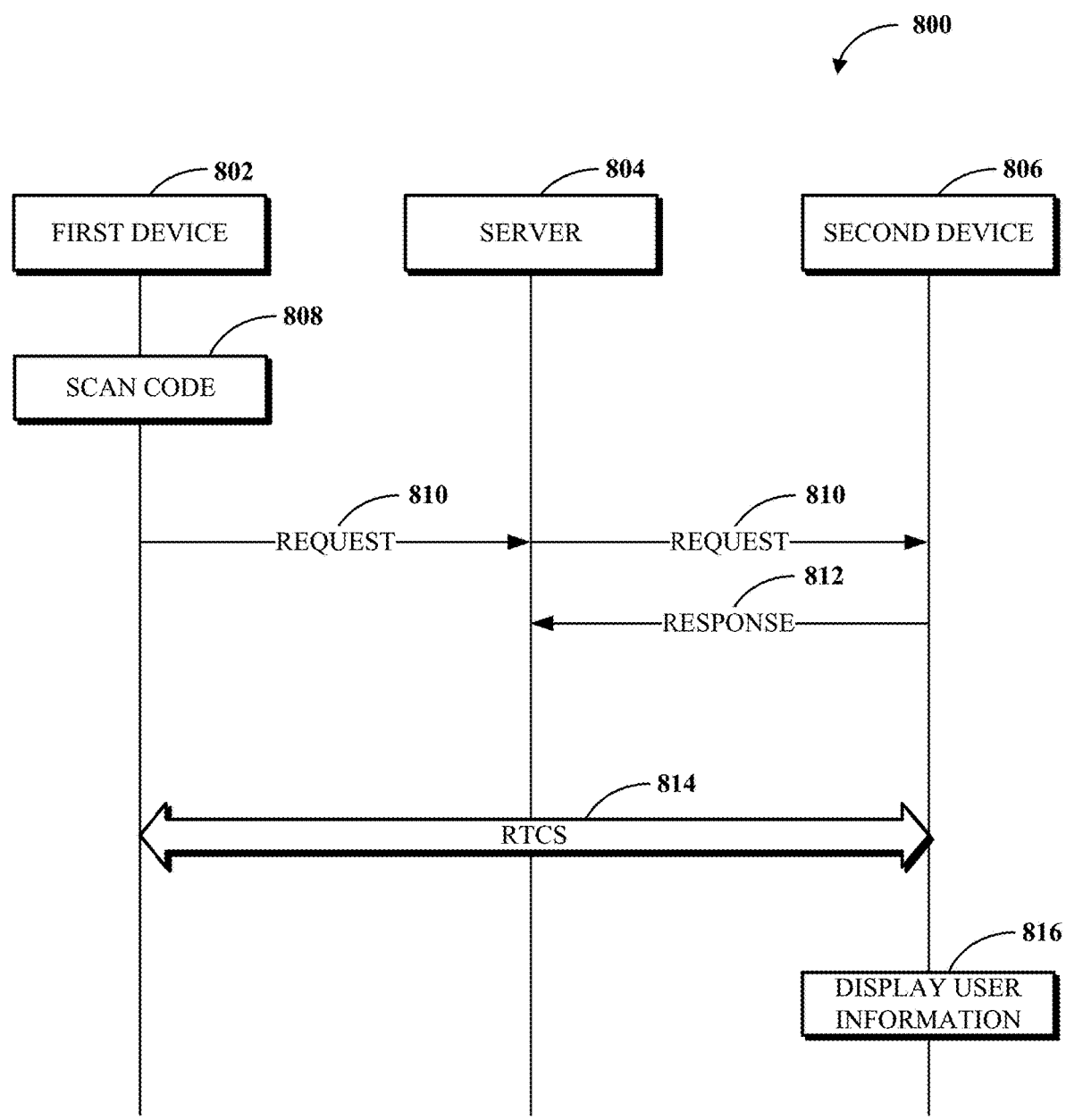
FIG. 8 is a swim lane diagram of an example of a system for conducting an RTSC using a customized code for each individual caller.

FIG. 8 is a swim lane diagram of an example of a system 800 for conducting an RTSC using a customized code for each individual caller. The system 800 includes a first device 802, a server 804, and a second device 806. One or both of the first device 802 or the second device 806 may be a client device, such as the desk phone 304, the computer 306, the mobile device 308, or the shared device 310 shown in FIG. 3. For example, one or both of the first device 802 or the second device 806 may each be a client device that runs software for connecting to software services of a software platform, such as services implemented via the software 312 through 318 shown in FIG. 3. In another example, neither of the first device 802 or the second device 806 may be a client device an may instead access such software services using a web browser or other non-client application. The server 804 may be used to instantiate one or more software services of a software platform (e.g., the software platform 300 shown in FIG. 3, for example, a chat messaging service, a telephony service, a video conference service, or another communication service.

In this example, the first device 802 may scan 808 a code using a camera of the first device 802. The code may be a customized code for the user of the first device 802. For example, the code may be printed on a mailer that is send to the user of the first device 802 by the user of the second device 806. The code may be associated with information of the user, such as a name of the user, a mailing address of the user, demographic information of the user, spending habits of the user, social media information of the user, or other information of the user. The code may also include an identifier associated with the code and information regarding the second device 806, such as a device ID, a device address, or both.

When the code is scanned by the first device 802, the first device transmits a request 810 to the server 804. The request may be a request to initiate a RTCS with the second device 806 and include the identifier associated with the code, the information associated with the user of the first device 802, the device ID of the second device 806, the device address of the second device 806, or a combination thereof. The server 804 forwards the request 810 to the second device. Upon acceptance of the request 810, the second device transmits a response 812 to the server 804. The response 812 may indicate that the second device 806 has accepted the request to initiate a RTCS with the first device 802.

The server 804 receives the response 812 from the second device 806 and initiates an RTCS 814 between the first device 802 and the second device 806. During the RTCS, the second device 806 displays 816 the information associated with the user of the first device 802. In one example, the information displayed at the second device 806 may be obtained from a database, such as a contact resource manager (CRM) based on the identifier of the code received in the request 810. In another example, the information displayed at the second device 806 may be based on information associated with the user of the first device 802 that is included in the request 810.

As an illustrative use case, the system 800 may be used by a real estate agent for client acquisition. In this example, the real estate agent may send out mailers to everyone in a particular neighborhood, where each mailer includes a code that is customized for each respective addressee of the mailer. Each code may be associated with information of each respective addressee of the mailer to aid the real estate agent in his or her sales cycle. In some implementations, the code may be included on marketing materials, billboards, and/or business cards. In some implementations, the code may be decommissioned, for example, when a marketing promotion ends. In this example, when the code is decommissioned, a consumer may be directed to a default webpage of the real estate agent when the code is scanned. In some implementations, the code may include a unique identifier associated with a location to allow the real estate agent to determine the location of where the interest in his/her services is generated.

In this example, when an addressee scans 808 the code using the camera of the first device 802, the RTCS 814 is initiated between the addressee of the first device 802 and the second device 806 of the real estate agent. Information associated with the addressee is displayed at the second device of the real estate agent during the RTCS 814. In this way, when the real estate agent receives a call from an addressee, the real estate agent is presented with the addressee's name and other information that can be used to make the call efficient, such as the addressee's age, income level, mortgage balance, or the like.

Figure 9:
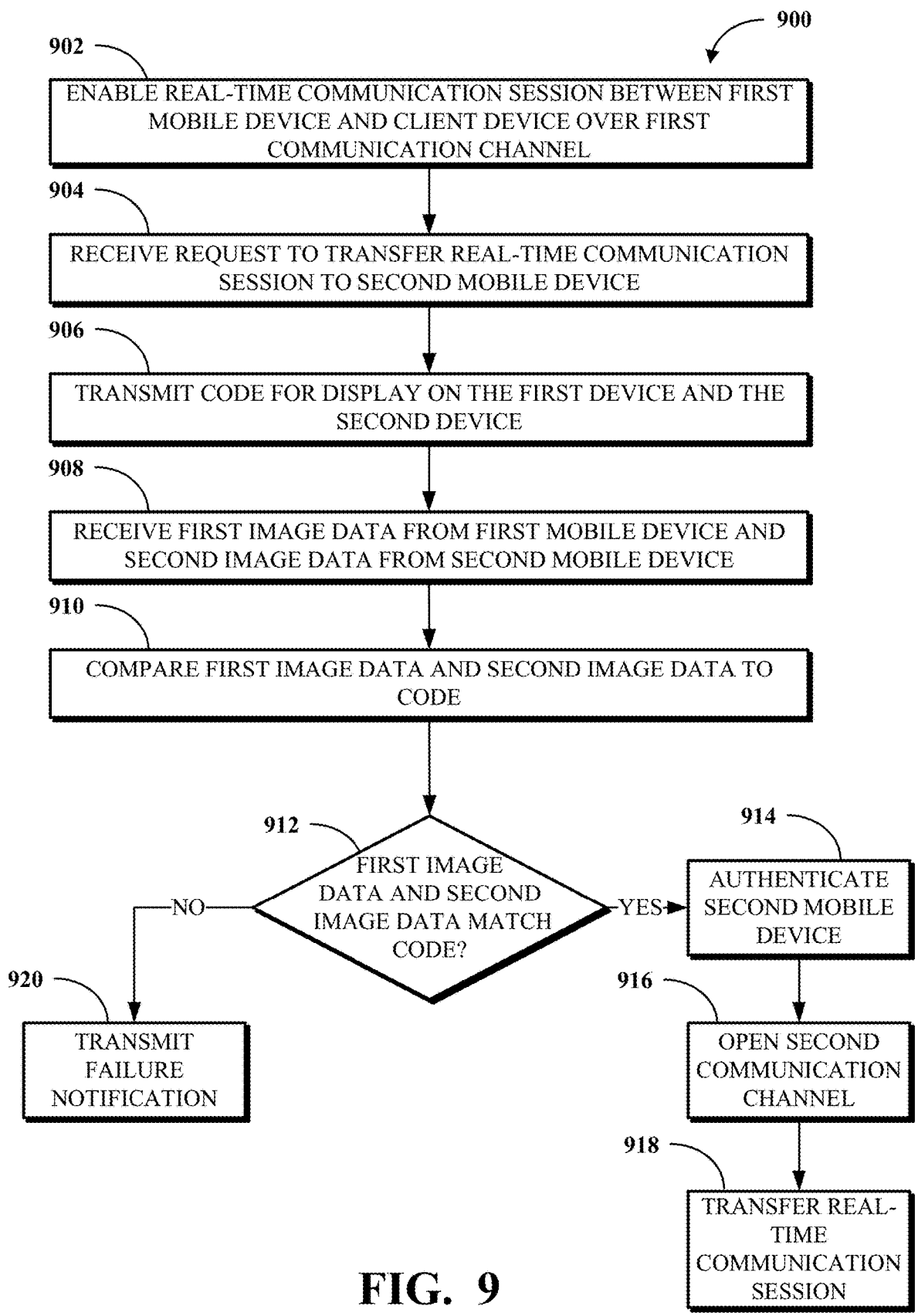
FIG. 9 is a flowchart of an example of a method for an RTCS transfer based on a visual code.

To further describe some implementations in greater detail, reference is next made to examples of methods may be performed by or using a system for visual code-based RTCS transfer. FIG. 9 is a flowchart of an example of a method 900 for an RTCS transfer based on a visual code. The method 900 can be executed using computing devices, such as the systems, hardware, and software described with respect to FIGS. 1-8. The method 900 can be performed, for example, by executing a machine-readable program or other computer-executable instructions, such as routines, instructions, programs, or other code. The steps, or operations, of the method 900 or another technique, method, process, or algorithm described in connection with the implementations disclosed herein can be implemented directly in hardware, firmware, software executed by hardware, circuitry, or a combination thereof.

For simplicity of explanation, the method 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, the method 900 includes enabling an RTCS between a first mobile device and a client device over a first communication channel. The RTCS between the first mobile device and the client device may be a chat messaging session, a telephony session, a video conference session, or another communication session.

At 904, the method 900 includes receiving a request to transfer the RTCS to a second mobile device. The request to transfer the RTCS may be received from the first mobile device, the second mobile device, or both. The request to transfer the RTCS may be received at any point during the RTCS.

At 906, the method 900 includes transmitting a code for display on the first device and the second device. The code is associated with the RTCS over the first communication channel, and may be a QR code, a bar code, an image, or a radio signal. In the case where the code is a radio signal, the code may be transmitted as an NFC signal, a Bluetooth signal, a Wi-Fi signal, or another radio signal. In some examples, the code may include an embedded pre-authentication code or other embedded information associated with the RTCS, such as channel information, a device identifier of the first mobile device, a device ID of the client device, or a combination thereof.

At 908, the method 900 includes receiving first image data from the first mobile device and second image data from the second mobile device. The first image data and the second image data may each include embedded information associated with the RTCS.

At 910, the method includes comparing the first image data and the second image data to the code. At 912, the method 900 includes determining whether the first image data and the second image data match the code. If the first image data and the second image data match the code at 914, the method 900 includes, at 914, authenticating the second mobile device. The authentication of the second mobile device may be based on a determination that the first image data and the second image data match the code.

At 916, the method 900 includes opening a second communication channel. The second communication channel may be opened based on the authentication of the second mobile device. The second communication channel is a communication channel between the client device and the second mobile device. Opening the second communication channel may include terminating the first communication channel between the first mobile device and the client device. At 918, the method 900 includes transferring the RTCS to the second communication channel such that the RTCS is continued between the client device and the second mobile device.

If the first image data and/or the second image data do not match the code at 914, the method 900 includes, at 920, transmitting a failure notification. The failure notification may be transmitted to the first mobile device, the second mobile device, the client device, or any combination thereof.

In some implementations, a CR may be transmitted to the client device 406 to obtain confirmation of a transfer of the RTCS to the second mobile device. The CR may be implemented as a pop-up notification, a notification in a chat message, or an SMS notification The CR may be used to prompt a user of the client device to provide an input, such as a touch input, a keyboard input, a mouse input, a voice input, or a gesture input. In response to the input, the method 900 may include receiving a response that indicates whether the transfer is confirmed or denied. If the transfer is confirmed, the RTCS is transferred to the communication channel between the client device and the second mobile device.

In some implementations, the method 900 may include transmitting a CR to the first mobile device. The CR may be used to prompt a user of the first mobile device to provide an input. In response to the input, the method 900 may include receiving a response that indicates whether the transfer is confirmed or denied. If the transfer is confirmed, the RTCS is transferred to the communication channel between the client device and the second mobile device. In some implementations, CRs may be transmitted to both the first mobile device and the second mobile device to obtain confirmation of a transfer of the RTCS to the second mobile device.

An aspect may include a method that includes enabling a communication session over a first communication channel between a first mobile device and a client device. The method may include transmitting a code for display on the first mobile device and the second mobile device. The method may include comparing, to the code, first image data received from the first mobile device and second image data received from the second mobile device. The method may include transferring the communication session to a second communication channel when the first image data and the second image data match the code.

An aspect may include a system that comprises a first mobile device, a second mobile device, a client device, and a server. The server may be configured to enable a communication session over a first communication channel between a first mobile device and a client device. The server may be configured to transmit a code for display on the first mobile device and a second mobile device. The server may be configured to compare, to the code, first image data received from the first mobile device and second image data received from the second mobile device. The server may be configured to transfer the communication session to a second communication channel when the first image data and the second image data match the code.

An aspect may include a non-transitory computer-readable medium comprising instructions that when executed by a processor, cause the processor to perform operations. The operations may include enabling a communication session over a first communication channel between a first mobile device and a client device. The operations may include transmitting a code for display on the first mobile device and the second mobile device. The operations may include comparing, to the code, first image data received from the first mobile device and second image data received from the second mobile device. The operations may include transferring the communication session to a second communication channel when the first image data and the second image data match the code.

In an aspect, a method may include enabling a real-time communication session over a first communication channel between a first mobile device and a client device. The method may include receiving a request from the first mobile device to transfer the real-time communication session to a second mobile device. The method may include transmitting a code for display on the first mobile device and the second mobile device. The method may include receiving first image data from the first mobile device and second image data from the second mobile device. The method may include comparing the first image data and the second image data to the code. The method may include authenticating the second mobile device based on a determination that the first image data and the second image data match the code. The method may include opening a second communication channel between the second mobile device and the client device. The method may include transferring the real-time communication session from the first communication channel to the second communication channel.

In an aspect, a system may include a first mobile device, a second mobile device, and a server. The server may be configured to enable a real-time communication session over a first communication channel between the first mobile device and the client device. The server may be configured to receive a request from the first mobile device to transfer the real-time communication session to the second mobile device. The server may be configured to transmit a code for display on the first mobile device and the second mobile device. The server may be configured to receive first image data from the first mobile device and second image data from the second mobile device. The server may be configured to compare the first image data and the second image data to the code. The server may be configured to authenticate the second mobile device based on a determination that the first image data and the second image data match the code. The server may be configured to open a second communication channel between the second mobile device and the client device. The server may be configured to transfer the real-time communication session from the first communication channel to the second communication channel.

In an aspect, a non-transitory computer readable medium comprising instructions that when executed by a processor, cause the processor to perform operations including enabling a real-time communication session over a first communication channel between a first mobile device and a client device. The operations may include receiving a request from the first mobile device to transfer the real-time communication session to a second mobile device. The operations may include transmitting a code for display on the first mobile device and the second mobile device. The operations may include receiving first image data from the first mobile device and second image data from the second mobile device. The operations may include comparing the first image data and the second image data to the code. The operations may include authenticating the second mobile device based on a determination that the first image data and the second image data match the code. The operations may include opening a second communication channel between the second mobile device and the client device. The operations may include transferring the real-time communication session from the first communication channel to the second communication channel.

In one or more aspects, a confirmation request may be transmitted to the first mobile device, wherein the confirmation request is a pop-up notification, a notification in a chat message, or an SMS notification requesting a confirmation of a transfer of the real-time communication session from the first communication channel to the second communication channel. In one or more aspects, a response may be received that indicates that the transfer is confirmed. In one or more aspects, the confirmation request may be a notification requesting confirmation of a transfer of the real-time communication session from the first communication channel to the second communication channel. In one or more aspects, a first response may be received from the first mobile device that indicates that the transfer is confirmed and a second response may be received from the client device that indicates that the transfer is confirmed. In one or more aspects, the code may be a QR code or a bar code. In one or more aspects, the QR code or the bar code may be associated with the real-time communication session over the first communication channel. In one or more aspects, a request from the second mobile device may be received to transfer the real-time communication session to the second mobile device. In one or more aspects, the code may include an embedded pre-authentication code.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   enabling a communication session over a first communication channel between a first mobile device and a client device;
   transmitting a code for display on the first mobile device and a second mobile device;
   comparing, to the code, first image data received from the first mobile device and second image data received from the second mobile device; and
   transferring the communication session to a second communication channel when the first image data and the second image data match the code.

2. The method of claim 1, further comprising:
   transmitting a request to the first mobile device to confirm a transfer of the communication session from the first communication channel to the second communication channel.

3. The method of claim 1, further comprising:
   transmitting a pop-up notification request to the first mobile device to confirm a transfer of the communication session from the first communication channel to the second communication channel; and
   receiving a response that indicates that the transfer is confirmed.

4. The method of claim 1, wherein the code is an image that includes an embedded code.

5. The method of claim 1, wherein the code is a bar code associated with the communication session over the first communication channel.

6. The method of claim 1, further comprising:
   transmitting a pop-up notification request to the first mobile device and the client device to confirm a transfer of the communication session from the first communication channel to the second communication channel; and
   receiving a first response from the first mobile device and a second response from the client device that each indicate that the transfer is confirmed.

7. The method of claim 1, wherein the code is a quick response (QR) code associated with the communication session over the first communication channel.

8. A system comprising:
   a first mobile device;
   a second mobile device;
   a client device; and
   a server configured to:
      enable a communication session over a first communication channel between a first mobile device and a client device;
      transmit a code for display on the first mobile device and a second mobile device;
      compare, to the code, first image data received from the first mobile device and second image data received from the second mobile device; and
      transfer the communication session to a second communication channel when the first image data and the second image data match the code.

9. The system of claim 8, wherein the code is a bar code associated with the communication session over the first communication channel.

10. The system of claim 8, wherein the server is further configured to:
    receive a request from the second mobile device to transfer the communication session to the second mobile device.

11. The system of claim 8, wherein the code includes an embedded pre-authentication code.

12. The system of claim 8, wherein the server is further configured to:
   transmit a chat message request to the first mobile device to confirm a transfer of the communication session from the first communication channel to the second communication channel.

13. The system of claim 8, wherein the server is further configured to:
   transmit a chat message request to the first mobile device to confirm a transfer of the communication session from the first communication channel to the second communication channel; and
   receive a response that indicates that the transfer is confirmed.

14. A non-transitory computer-readable medium comprising instructions that when executed by a processor, cause the processor to perform operations comprising:
   enabling a communication session over a first communication channel between a first mobile device and a client device;
   transmitting a code for display on the first mobile device and a second mobile device;
   comparing, to the code, first image data received from the first mobile device and second image data received from the second mobile device; and
   transferring the communication session to a second communication channel when the first image data and the second image data match the code.

15. The non-transitory computer-readable medium of claim 14, wherein the operations further comprise:
   transmitting a short messaging service (SMS) request to the first mobile device to confirm a transfer of the communication session from the first communication channel to the second communication channel.

16. The non-transitory computer-readable medium of claim 14, wherein the operations further comprise:
   transmitting a short messaging service (SMS) request to the first mobile device to obtain a confirmation of a transfer of the communication session from the first communication channel to the second communication channel; and
   receiving a response that indicates that the transfer is confirmed.

17. The non-transitory computer-readable medium of claim 14, wherein the code is embedded in an image.

18. The non-transitory computer-readable medium of claim 14, wherein the code is a bar code.

19. The non-transitory computer-readable medium of claim 14, wherein the operations further comprise:
   transmitting a short messaging service (SMS) request to the first mobile device and the client device to confirm a transfer of the communication session from the first communication channel to the second communication channel; and
   receiving a first response from the first mobile device and a second response from the client device that each indicate that the transfer is confirmed.

20. The non-transitory computer-readable medium of claim 14, wherein the code is a quick response (QR) code associated with the communication session over the first communication channel.

* * * * *